United States Patent [19]
Hoeppner

[11] Patent Number: 5,906,737
[45] Date of Patent: May 25, 1999

[54] FILTER CORE SYSTEM

[76] Inventor: Michael A. Hoeppner, 11517 Pennet Run, Fort Wayne, Ind. 46845

[21] Appl. No.: 09/041,487

[22] Filed: Mar. 12, 1998

Related U.S. Application Data

[60] Provisional application No. 60/045,395, May 1, 1997.

[51] Int. Cl.⁶ .......................... B01D 29/15; B01D 29/19; B01D 25/00

[52] U.S. Cl. ...................... 210/232; 210/457; 264/328.1; 264/241; 285/330; 285/913

[58] Field of Search .................................. 210/232, 457; 264/328.1, 241; 285/330, 913

[56] References Cited

U.S. PATENT DOCUMENTS

| | | |
|---|---|---|
| 2,296,161 | 9/1942 | Hall . |
| 3,187,898 | 6/1965 | Baker . |
| 3,187,899 | 6/1965 | Prizler . |
| 3,406,831 | 10/1968 | Bush . |
| 3,786,925 | 1/1974 | Block . |
| 4,021,351 | 5/1977 | Bray . |
| 5,102,541 | 4/1992 | Breitbach . |
| 5,423,984 | 6/1995 | Belden . |

*Primary Examiner*—Thomas M. Lithgow
*Attorney, Agent, or Firm*—Randall J. Knuth

[57] ABSTRACT

A filter core unit comprising various number of segments having a wall with a plurality of holes and a means to attach one segment to a second segment whereby the length of the filter core unit can be varied by adding and subtracting segments. A method of connecting one segment to another is also disclosed.

14 Claims, 3 Drawing Sheets

FILTER CORE SYSTEM

This appliction claims the benefit of U.S. provisional application Ser. No. 60/045,395 filed May 1, 1997.

BACKGROUND OF THE INVENTION

1. Field of the invention

The present invention relates to an apparatus for creating a multi-length plastic tube for use in a water filter and more particularly, to the use of the multi-length plastic tube section in EDM (Electric Discharge Machining) apparatus water filters.

2. Description of the related art

Electric Discharge Machining systems utilizes water to cool and/or transport metal and other debris or shavings created during the machining of a workpiece. In most EDM machines, there is a pumping system that takes water, especially in a closed loop system, applies it to the working area to cool the surroundings and pick up debris and heat, and remove them from the area. The water then flows through a filter assembly to clean the water of such shavings and debris. Such filtered water is then available for reuse.

A problem in the art is that with current EDM filters having metal type cylindrical cores, there is a possibility of corrosion of such metal cores. The water normally utilized in EDM machining is de-ionized to maintain a substantially non-conductive property. As the filter, with an iron core, is utilized, interaction may be created between the metal shavings and debris with the metal center core, to cause corrosion thereof. Such corrosion of the metal core alters the water, making it somewhat conductive, thereby making the EDM process less efficient. In some EDM applications where higher precision machining is necessary, such corrosion problems and corresponding reduction of EDM efficiency is an important concern.

Different attempts have been made to combat this corrosion problem such as plating the iron core with certain non-corrosive ingredients, which becomes expensive or labor intensive. Further solutions of the problem include the use of creating plastic cores and plastic end-caps.

The use of plastic extruding technology has been tested but to date it has been impossible to obtain a wall thickness heavy enough to withstand the fluid hydraulic pressure seen by the EDM filter assembly during use.

Although the initial operating pressure of the typical water pumping system in EDM machines is approximately 18–20 PSI, as the filter material becomes saturated with debris, fluid pressures have been observed of up to 85–95 PSI. Furthermore, the current extruded plastic cores, when cut perpendicular to their longitudinal length, loses strength because of insufficient strength between core openings.

A problem with production of injection molded, plastic filter cores is the inability to vary the length of a plastic core unit on the fly. For creating injection molded plastic cores, each different length of the plastic core needs a different mold. Huge costs would thereby be created by making molds for the different size cores needed to satisfy all of the requirement of the different size EDM filter assemblies currently available.

The present invention solves the particular problem of eliminating the need for different sizes of injection molds for plastic filter cores and column systems.

SUMMARY OF THE INVENTION

The present invention is that of a plastic core unit of a particular size having particular end fittings along its longitudinal edges for attachment to similar type fittings of a second similar plastic column piece.

One embodiment of the present invention is a filter core unit comprising a segment with a wall having a plurality of holes and a means to attach one segment to a second segment.

A second embodiment of the present invention is a filter core unit comprising at least two segments with a wall produced by plastic injection molding. Each segment has a plurality of holes. There is at lease one tongue and one groove on one axial end of the segment and one groove and one tongue on the opposing axial end. The length of the filter core unit can be varied while maintaining uniform thickness of the segment's wall by interlocking the tongue of one segment with the groove of a second segment. There is a filter medium operatively associated with the wall.

A third embodiment of the present invention is a filter core unit comprising a segment with a wall produced by plastic molding. The segment has a plurality of holes and has opposing axial ends. There is a tongue and a groove on one axial end and a groove and a tongue on the opposing axial end. The length of the filter core unit can be varied while maintaining uniform thickness of the wall. This lengthening is achieved by interlocking the tongue of one segment with the groove of a second segment.

One method of constructing a filter core unit comprises the steps of providing at least two segments constructed of plastic. Each core segment has interlockable protuberances on axial ends. The two segments are connected to one another by interlocking their respective protuberances together. A filter medium and housing is then assembled about the connected segments.

An advantage of the present system is that independent of the number of plastic pieces utilized, the assembly has the same stress factors at all points.

Another advantage of the present invention is that as it is being injected molded, the plastic cylindrical core may be cut perpendicular to the longitudinal axis at any point without loss of strength.

Another advantage of the present invention is that any size length of plastic core column may be utilized by simply stacking and interfitting additional plastic core section pieces together. By being able to customize the particular length of the plastic core assembly, the manufacturer is able to supply length of plastic cylindrical core for any particular filter unit length. Another advantage of the present invention is that even at high pressure differentials between the interior and exterior sides of the plastic core a risk of collapse of the plastic core is reduced, thereby increasing the operation life of the filter assembly.

Another advantage of the present invention is that of the particular fastener system maintains the same thickness of the plastic core column on all points along its longitudinal length.

A further advantage of the present invention is that because of the small height of the fastener extensions and/or attachment fittings, blow-by of water between the core and end-caps when the plastic filter core, is attached to the end-caps of the standard EDM filter assembly, is prevented.

Another advantage of the present invention is that it is environmental friendly. During incineration of the used EDM filter unit, the plastic core will be incinerated, thereby the remnants of the filter will take up less land fill space as compared to the old metal cores.

Another advantage of the present system is that although the particular embodiment is designed for use as the internal core element of a water filter, the same type of plastic column and fastener system may be utilized on the outside of the filter media, for example, EDM water filters.

An advantage of the present invention is that by the use of injection molding technology, different types of plastic base materials, such as polypropylene, polystyrene, and preferably ABS plastics may be utilized in the construction of such plastic core columns.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
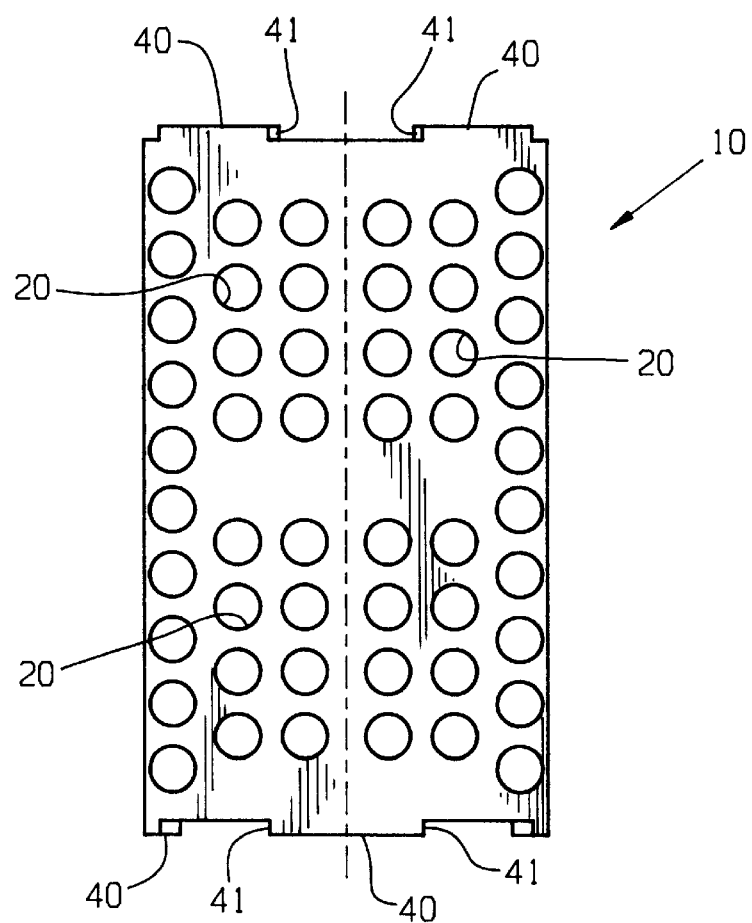
FIG. 1 is a elevational view of a single plastic cylindrical core unit of the present invention.

The present invention as shown in FIG. 1, is that of a cylindrical plastic core unit 10 for one are both of the interior or exterior of filter assemblies. A typical plastic core unit 10 in the present invention is cylindrical, but depending on the use and type of filter assemblies other shapes are possible.

FIG. 1 shows core unit 10 having a plurality of through holes 20 which permit liquid to enter into the interior 30 of core unit 10. Along the outer longitudinal edges of core unit 10 are formed a number of protuberances 40 which are shaped to interfit like protuberances on a second core unit 10. Protuberances 40 of one core unit 10 fit and fasten to a second core unit 10 thereby producing a connection, possibly by an interference fit. In one possible configuration, protuberance vertical edge 41 is radially angled toward the center of core unit 10.

Core unit 10 is produced by standard injection molding techniques using many different types of plastic base material such as polypropylene, polystyrene. Preferably ABS plastic is used in the construction of such plastic core cylinder 10.

Figure 2:
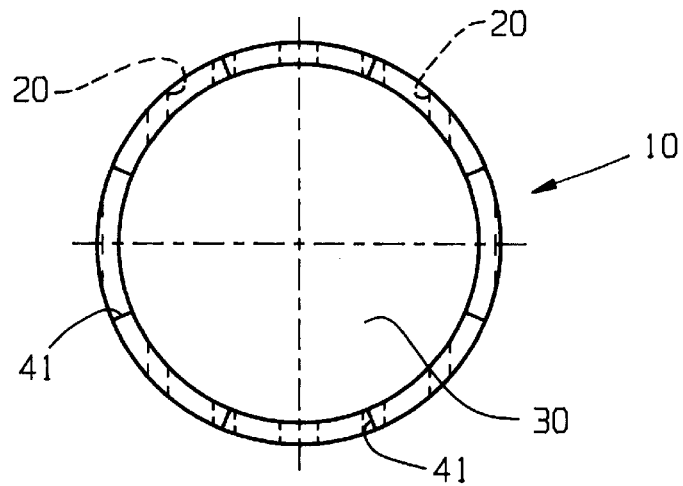
FIG. 2 is a sectional view of the plastic cylindrical core unit of FIG. 1.

FIG. 2 shows core unit 10 looking down its longitudinal axis.

Figure 3:
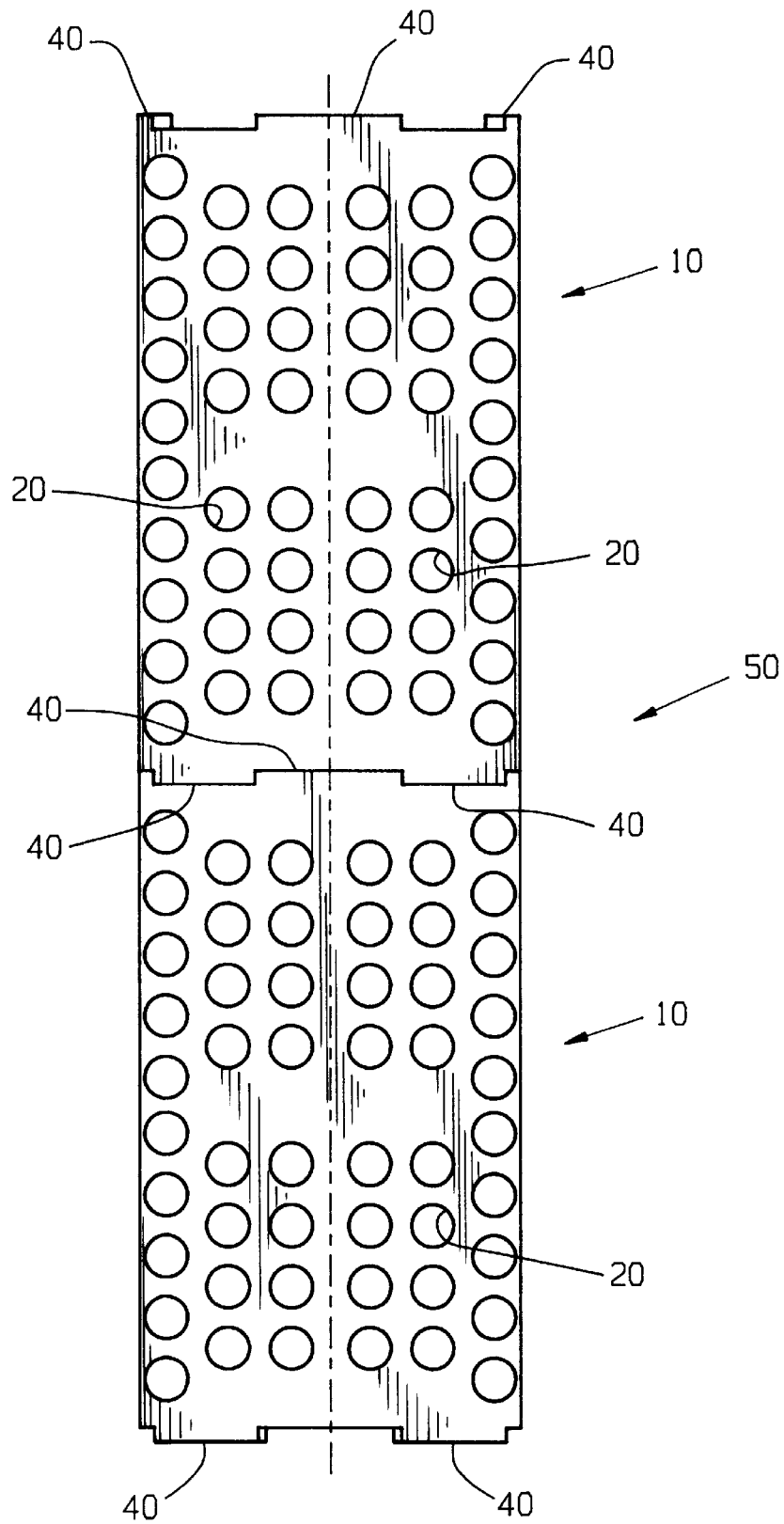
FIG. 3 is a elevational view showing the connection of two core units.

FIG. 3 shows with intermitting and connecting of two core units 10 the alternate protuberances 40 intermitting with like protuberances 40 on an opposite core unit 10.

Figure 4:
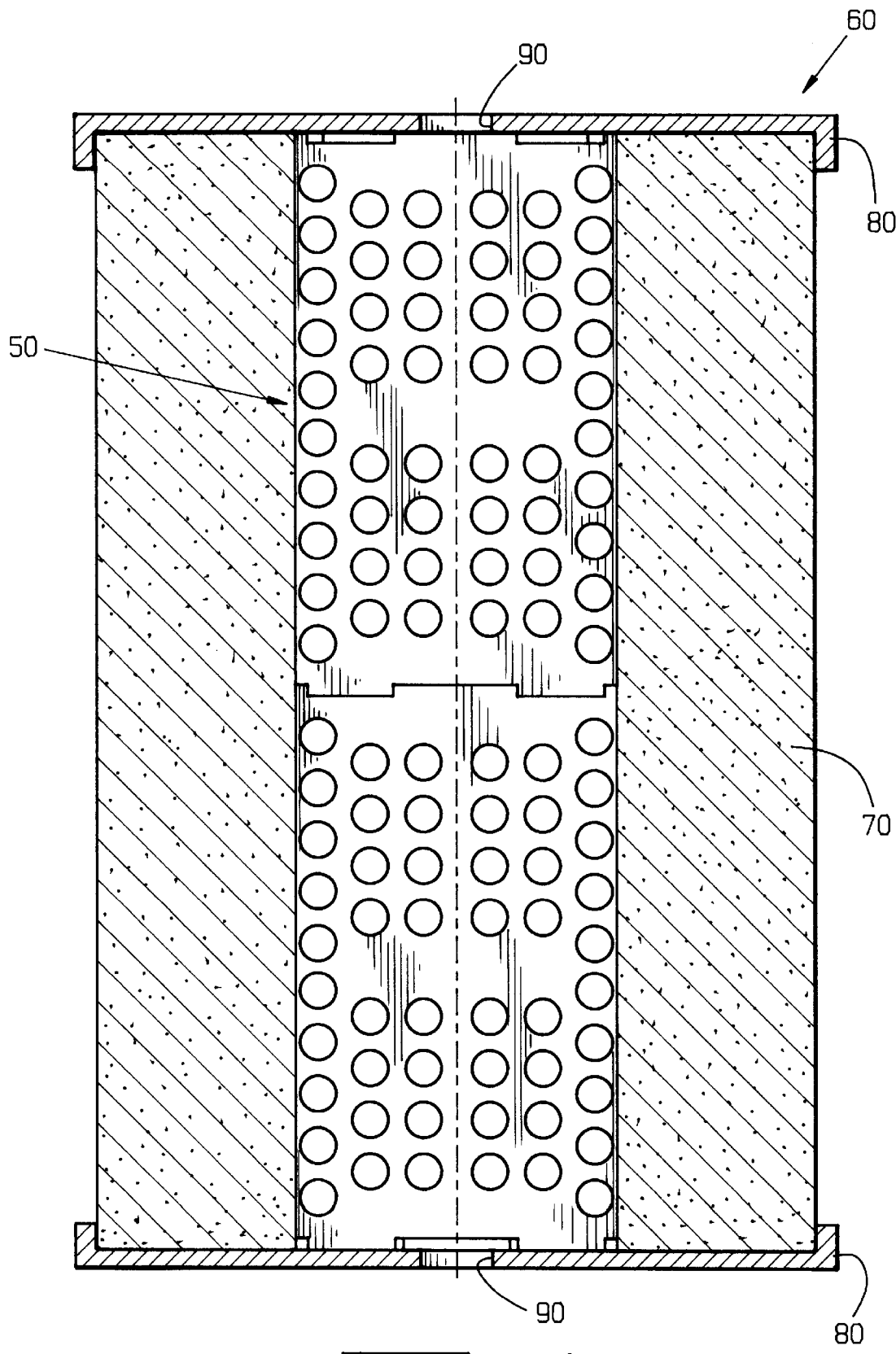
FIG. 4 is a sectional view of the core units of the present invention disposed within a typical EDM water filter assembly having end-caps and a filter cartridge.

The typical use of such core unit assembly 50 as shown in FIG. 3, is for use in a liquid filtration unit, such as water filter and preferably that of a typical EDM filter cartridge. FIG. 4 shows a filter unit assembly 60 comprising the core unit assembly unit 50 located within filter element 70, normally constructed of corrugated paper or other filter media. Plastic end-caps 80 are fitted over the axial ends of both core assembly 50 and filter element 70. End-caps 80 include a axial bore 90 through which filtered liquid may emerge.

The filter unit assembly 60 is connected together by the application of adhesive between filter element 70 and end-cap 80. Additionally, adhesives, such as a epoxy or other liquid proof adhesives, are utilized to attach the axial ends of core assembly 50 to end-caps 80.

Although the present embodiment of the invention, square type protuberances 40 are utilized for connecting between core units 10, alternate protuberance shapes may be utilized to connect core units 10. By utilizing and stacking a plurality of core unit 10 various lengths of the core assembly 50 may be created to satisfy the different axial lengths for media 70 utilized in standardized filter cartridges.

What is claimed is:

1. A filter core unit comprising:
    a segment with a segment wall having substantially uniform thickness, said segment wall forming a filter core wall having substantially uniform thickness;
    said segment wall having a plurality of holes; and
    means to non-overlappingly attach said segment to a second segment whereby the length of said core unit may be varied by addition and subtraction of a said segment while maintaining said filter core wall substantially uniform thickness.

2. A filter core unit as in claim 1 wherein means to attach said segment to a second segment comprises:
    a plurality of protuberances on each said segment, whereby said protuberances of axially extending said segment interlock with said protuberances said second another segment.

3. A filter core unit as in claim 1 wherein the means to attach said segment to a second segment comprises:
    a tongue on said segment; and
    a groove on said second segment, said tongue interlocking with said groove such that said walls of the attached segments along the filter core unit maintain said substantially uniform thickness.

4. A filter core unit as in claim 1 which is produced by injection molding ABS plastic.

5. A filter core unit as in claim 1 which is produced by injection molding polystyrene.

6. A filter core unit as in claim 1 which is produced by injection molding polypropylene.

7. A filter core unit as in claim 2 which is produced by injection molding ABS plastic.

8. A filter core unit as in claim 2 which is produced by injection molding polystyrene.

9. A filter core unit as in claim 2 which is produced by injection molding polypropylene.

10. A filter core unit as in claim 1 in which a filter medium surrounds said wall.

11. A filter core unit as in claim 1 in which a filter medium is surrounded by said wall.

12. A method of constructing filter core unit, comprising the steps of:
    providing at least two core segments having a wall of substantially uniform thickness, constructed of plastic, each core segment provided with interlockable protuberances on axial ends;
    connecting the two segments together by interlocking their respective protuberances without overlapping the two segments; and then assembling a filter medium and housing about said connected segments.

13. A filter core unit comprising:

at least two segments with a wall having substantially uniform thickness produced by plastic injection molding;

said segment having a plurality of holes;

said segment having opposing axial ends;

a tongue on one axial end of said segment;

a groove on the opposing axial end of said segment, whereby the length of said filter core unit can be varied while maintaining substantially uniform thickness of said wall by interlocking said tongue of one said segment with said groove of a second segment without overlapping said segment with said second segment; and filter media operatively associated with said wall.

14. A filter core unit comprising:

a segment with a wall having substantially uniform thickness produced by plastic injection molding;

said segment having a plurality of holes;

said segment having opposing axial ends;

a tongue on one axial end of said segment;

a groove on the opposing axial end, whereby the length of said filter core unit can be varied while maintaining said substantially uniform thickness of said wall by interlocking said tongue of said segment with said groove of a second segment without overlapping said segment with said second segment; and filter media operatively associated with said wall.

* * * * *